United States Patent Office 3,437,435
Patented Apr. 8, 1969

3,437,435
METHOD OF PREPARING MANGANESE DIOXIDE
William G. Moore, Midland, Mich., assignor to The Dow Chemical Company, Midland, Mich., a corporation of Delaware
No Drawing. Filed Apr. 29, 1965, Ser. No. 452,967
Int. Cl. C01g 45/02
U.S. Cl. 23—145                            17 Claims This invention relates to the preparation of manganese dioxide and more particularly concerns a novel method of preparing the epsilon, gamma, and the rho forms of battery grade manganese dioxide ($MnO_2$).

A principal object of the present invention is to provide a new and novel method for preparing manganese dioxide.

A further object of the invention is to provide a novel method of preparing the epsilon, gamma, and the rho crystalline forms of manganese dioxide, all of which are particularly suitable for use in dry cell batteries.

Another object is to provide a method of preparing a stable battery grade manganese dioxide having particular utility as a depolarizer in dry cell batteries.

These and other objects and advantages of the invention will become more apparent from the following detailed description.

In general, the present invention comprises a novel method of preparing the gamma, epsilon, or rho form, and mixtures thereof, of manganese dioxide by admixing into a stirred reactor a concentrated manganese salt solution separately but concurrently with an oxidizing agent selected from the group consisting of the hypochlorites of calcium, magnesium and strontium, at a temperature range and flow rates to provide a manganous ion concentration ($Mn^{++}$) and an oxychloride ion ($OCl^-$) concentration in a liquid reaction mass, as hereinafter defined, in sufficient proportion to produce dominant amounts of a precipitate of the desired crystalline form of the manganese dioxide product sought. Normally, the manganese salt solution and oxidant are added to an initial aqueous inventory of manganous ion in the reactor.

In practicing the process of the present invention a reactor of suitable capacity is provided. This contains a stirred inventory of water into which the reactants are added at a temperature within the range indicated below to produce a predetermined product form. The water inventory preferably will contain a concentration of manganous values in the order of, for example, 1 gram per liter of inventory liquid. The hypochlorite and the manganese salt solutions having been previously prepared are then both added separately but concurrently to the reactor at flow rates adjusted to produce the following operable and preferred concentration ratios of manganese ion ($Mn^{++}$) to oxychloride ion ($OCl^-$) in the reaction mass:

| $MnO_2$ form | Temperature range, ° C. | Ratio $Mn^{++}$ to $OCl^-$ |
|---|---|---|
| Gamma ($\gamma$) | Operable 10 to 60 | At least about 2. |
| | Preferred 30 to 50 | 40–50. |
| Epsilon ($\epsilon$) | Operable 10 to 60 | Not to exceed about 2. |
| | Preferred 30 to 50 | 0.01–0.1. |
| rho ($\rho$) | Operable 60 to 100 | At least 2. |
| | Preferred 70 to 90 | 40–50. |

In other words in preparing amounts primarily of the gamma form of $MnO_2$ by the present process, the temperature in the reactor must be below about 60° C. with an excess of manganous ion being present therein of at least about 2 to 1. To prepare the epsilon form the temperature requirements are the same but an excess of hypochlorite must preferably be present, the above ratio of manganous ion thereto not exceeding at any time about 2. The ratio of reactants in preparing the rho form is the same as when preparing the gamma form but the temperature in this case must be maintained at 60° C. or above. The pH of the reaction mass is normally maintained within the range of from about 1 to about 3.5.

As a practical matter in preparing the $MnO_2$ product forms of the invention, the transition temperature of about 60° C. from the gamma and epsilon forms to the rho form in order to obtain primarily one form or the other has been observed as more nearly approximating a temperature range of, for example, from about 55° C. to about 60° C. Accordingly, when operating within this transitional range, mixtures of the product forms are obtained (which in certain cases may be highly desirable). When a desired amount of the $MnO_2$ product being prepared is obtained, the reaction is terminated by stopping the flow of reactants. The solid $MnO_2$ precipitate thereof is separated from the liquid phase by any of the conventional methods such as, for example, centrifuging or filtration. The product so-separated may then be washed with, for example, water and dried for immediate or subsequent use.

Preferably an alkaline chlorinated lime solution, that is, calcium hypochlorite (CaClOCl) is used in the present process as the oxidizing agent. This lime solution may be prepared by bubbling chlorine through an aqueous solution of lime ($Ca(OH)_2$) containing preferably a slight excess of undissolved calcium oxide (CaO) to maintain saturation during chlorination. In practice, for example, the hypochlorite solution is maintained at a pH of not lower than about 9–9.5 and preferably at a pH of about 12 or higher during chlorination. The resulting hypochlorite is about 1 to 2 molar in concentration. Preferably, when the calcium hypochlorite solution is used it is saturated with respect to lime and will have a pH of about 12. Calcium hypochlorite solutions which are unsaturated with respect to lime, however, may also be employed provided they are alkaline in pH.

Examples of manganese salts which may be employed in the invention are those which will provide soluble manganous ions or values ($Mn^{++}$) in solution, including manganous nitrate and manganous chloride, the anion of which will not react to form with other values in the reactor undesirable solids which will contaminate the desired manganese dioxide product. The concentration of the manganese salt in the solution for addition into the reactor should be such as to readily permit control of the manganous ion concentration in the reaction mass within the range as specified herein for the $MnO_2$ crystalline form desired. The concentration of these salts in the solution is not otherwise critical. A convenient concentration of manganous values in the salt solution may range, for example, from about 10 to about 20 weight percent. Manganous chloride is preferred for use in such solutions.

Group I metal hypochlorites, of e.g., sodium, potassium, lithium may not ordinarily be used in the process of the present invention inasmuch as at the range of reaction temperatures specified herein the resulting $MnO_2$ product becomes contaminated with the metal ions of said hypochlorites.

In an attempt to extend the present invention to the use of barium hypochlorite it was observed that the hereinbefore described desired product forms are not obtained. Barium hypochlorite therefore is not an equivalent to the operable Group II metal hypochlorites specified.

The manganese dioxide prepared in the foregoing manner and in accordance with the invention is useful as a depolarizer in dry cell batteries, both the gamma and rho forms giving a particular long shelf life to the cell in which it is used.

The following examples serve to illustrate the novel method of the present invention but are not to be construed as limiting the invention thereto.

Example I

Into a 50 gallon glass lined stirred tank was placed an initial inventory of 15 gallons of a 1 gram per liter manganous chloride solution. The tank was equipped with a steam jacket to heat the contents to about 75° C. and was closed at the top except for (a) a vent to draw off evolved chlorine produced in the reaction in order to maintain an atmosphere of chlorine over the reaction mass and (b) separate feed lines for introducing a (previously prepared) 10 percent aqueous manganese chloride and about a 1.0 Normal calcium hypochlorite solution (having a pH of about 12) therein. The feed solution of manganous ion and hypochlorite were started and controlled by rotameter readings to maintain an excess of manganous ion in the reactor and a ratio of that to the hypochlorite of about 50 to 1.

After one hour and forty-five minutes a sample of the solution phase of the reaction mass was assayed at 1.18 grams of manganese per liter showing that the feed solution flows were in balance. Only a trace of $OCl^-$ or $Cl_2$ (0.001 Normal $OCl^-$ or less was noted in the reactor). During the reaction the pH of the reaction mass varied between 1.2 to 1.5. A quantity of black $MnO_2$ precipitate was obtained.

A sample of this precipitate was washed, dried and X-rayed to determine its structure. Essentially single phase Rho-$MnO_2$ was observed. Furthermore, an identical sample was employed in an A-sized dry cell as a depolarizer and was found to have an excellent shelf life and depolarizing properties.

Example II

Into a 22 liter 3 necked flask equipped with a flat blade stirrer, feed lines for the addition of reactants, and a vent for removing by-product chlorine, was placed 4 liters of an initial inventory of water to which said reactants would be added. The flask and contents were placed on a heating mantel to maintain a temperature of contents in the reactor at about 57° to 53° C. The two reactants comprising previously prepared solutions of a 128 grams per liter $MnCl_2$ solution and a 135 grams per liter solution of $Ca(OCl)Cl$ were added separately and concurrently to the reactor flask by controlling the flow thereof by a rotameter to give a slight excess in the liquid phase of the reactor contents of $OCl^-$ ion over the $Mn^{++}$ ion concentration so as to provide a ratio of the manganese to the hypochlorite of about 0.45 to 1. After 1 hour of operation this ratio was calculated to be about 0.30 to 1. After another 4 hours (5 hours in all), the reaction was terminated. The $MnO_2$ precipitate product was washed with water and dried. Examination by X-ray diffraction of a sample of this material showed that the crystal phase was that of the epsilon form.

Example III

The reaction of Example II above was repeated except that the reactant feed flows were adjusted to provide a $Mn^{++}$ to $OCl^-$ ratio in the reactor of about 0.001 to 1. A precipitate of manganese dioxide epsilon phase product was obtained similar to that of the above example.

Example VI

To a similarly equipped 22 liter flask as in Example II above was added separately but concurrently a 130 grams per liter manganese chloride solution and a 0.73 Normal hypochlorite solution at adjusted flow rates to provide to the reaction mass a pH of about 2.4, a slight excess of manganese ion, and a trace of $OCl^-$ ion such to give a ratio of manganese ion to hypochlorite ($OCl^-$) of about 42 to 1. After 6 hours of continuous operation under these conditions and at a temperature of from 20°–25° C. the reaction was terminated, the $MnO_2$ precipitate filtered off, then washed and dried. X-ray diffraction examination showed the crystalline form of the product to be the gamma phase.

Example V

A portion of the manganese dioxide prepared in Examples I, II and IV was battery tested for stability. "A" size cell batteries were prepared in accordance with the standard procedure outlined in the U.S. Army Signal Corps requirement for manganese dioxide for military batteries per their specification SCL–3175. The A cells so-prepared were initially tested in accordance with their specification by applying a constant resistance of 167 ohm and measuring the hours required to reduce the battery voltage to 1.13 volts. The batteries were then stored for 3 months at 70° F. and again given the same "drain test." The results of these tests are shown in the table below. These results show the batteries to have a good shelf life and, accordingly, the manganese dioxide used therein to be stable.

| From above example | Initial test (hours) | 3 months test (hours) |
|---|---|---|
| I | 130 | 130 |
| II | 134 | 120 |
| IV | 134 | 130 |

Example VI

About 400 ml. of a 11.6 gram per liter manganese chloride solution was placed in a stirred reactor vessel and brought to an initial temperature of about 83° C. To this was added dropwise 100 ml. of a 0.62 Normal chlorinated magnesium hydroxide solution, i.e., a magnesium hypochlorite solution, during a total reaction period of about 30 minutes. The average temperature of the reaction mass during the 30 minute reaction period after the hypochlorite addition was started was about 70° C. The manganese ion concentration in the reaction mass at all times exceeded the hypochlorite oxychloride ion concentration, by about 100 times. The pH of the reaction mixture varied from 2.8 to about 3.3. After termination of the reaction the resulting precipitate of manganese dioxide was separated from the liquid phase, washed with 1 liter of $H_2O$, and dried. About 1 gram of rho phase manganese dioxide was recovered.

Example VII

About 400 ml. of a 10.8 gram per liter manganese chloride solution was placed in a stirred reactor vessel and brought to an initial temperature of about 85° C. To this was added dropwise 200 ml. of a 0.86 Normal strontium hypochloride solution, during a total reaction period of about 30 minutes. The average temperature maintained after the hypochlorite addition was started was about 72° C. The ratio of manganese ion to oxychloride ion during the run was about 100, thus showing an excess of the manganese ion. The pH at the end of the reaction was about 2.1. Two grams (dry weight basis) of rho phase manganese dioxide were recovered by filtration, washing with $H_2O$ and drying for 2 hours at 105° C.

BARIUM HYPOCHLORITE TESTS

To illustrate the inoperability and non equivalence of barium hypochlorite as the oxidant in the present invention, 500 ml. of a 53 gram per liter solution of $MnCl_2$ was put in a flask and heated to an initial temperature of 60° C. To this was added dropwise 370 ml. of a 0.80 Normal barium hypochlorite solution over a total reaction period of 85 minutes. During this period the pH varied from about 1.5 to about 1.3. At the termination of the reaction the flask and contents were cooled and the resulting manganese dioxide precipitate separated from the liquid phase by filtration. So-separated the precipitate was washed with 3 liter of water, then dried for about 48 hours at 105° C. Nine grams of manganese dioxide were recovered exhibiting a crystal phase other than that obtained in the present process, apparently an alpha form. It assayed as follows:

4.0 grams per cubic inch
83.5% $MnO_2$
57.7% Mn
4.8% barium

The above barium hypochlorite test was repeated except that an average reaction temperature of about 21° C. was employed. The crystal phase of the resulting $MnO_2$ product was other than that obtained in the present invention, apparently an alpha phase. The product assayed at 3.7 grams per cubic inch
76.0% $MnO_2$
56.0% Mn
3.12% barium In a final barium hypochlorite test 450 ml. of the manganese chloride solution was added dropwise to 700 ml. of the barium hypochlorite solution at a temperature in the reactor of about 25–26° C. and pH of about 3.0. The resulting manganese dioxide precipitate was similarly separated, washed, and dried. It exhibited a pattern similarly as described for the control test directly above. It assayed as follows:

3.7 grams per cubic inch
68.7% $MnO_2$
44.2% Mn
14.6% barium

The present invention can be modified and changed without departing from the spirit or scope thereof and it is understood that the invention is limited only as defined in the appended claims.

I claim:

1. A method of preparing manganese dioxide which comprises: reacting a liquid reaction mass of an alkaline hypochlorite solution selected from the group consisting of the hypochlorites of calcium, magnesium and strontium and an aqueous manganese salt solution at a temperature within the range from about 10° C. to about 100° C. and at a pH of from about 1 to about 3.5, while maintaining a ratio of manganous ion to oxychloride ion in the liquid reaction mass of from about 0.01 to about 50, said manganese salt so-reacted having an anion which does not form insoluble solid by-product material with the hypochlorite, thereby forming a solid manganese dioxide precipitate in the liquid reaction mass; and separating said precipitate from said reaction mass.

2. The method of claim 1, wherein the alkaline hypochlorite which is reacted with the aqueous manganese salt is a saturated calcium hypochlorite solution.

3. A method of preparing rho phase manganese dioxide which comprises: reacting a liquid reaction mass of an alkaline hypochlorite solution selected from the group consisting of the hypochlorites of calcium, magnesium and strontium with an aqueous manganese salt solution at a temperature within the range of from about 60° C. to about 100° C. and at a pH of from about 1 to about 3.5, while maintaining a ratio of manganous ion to oxychloride ion in the liquid reaction mass of at least about 2, said manganese salt so-reacted having an anion which does not form insoluble by-products with said hypochlorite, thereby forming solid rho phase manganese dioxide precipitates; and separating said precipitate from said reaction mass.

4. A method of preparing rho phase manganese dioxide which comprises: reacting a liquid reaction mass of an alkaline calcium hypochlorite solution with an aqueous solution of a manganese salt selected from the group consisting of manganese chloride and manganese nitrate at a temperature within the range of from about 60° C. to about 100° C. and at a pH of from about 1 to about 3.5, while maintaining a ratio of manganese ion to oxychloride ion in the liquid reaction mass of at least about 2, thereby forming solid rho phase manganese dioxide precipitate; and separating said precipitate from said reaction mass.

5. The method of claim 4, wherein the calcium hypochlorite solution has a pH of about 12.

6. The method of claim 4, wherein the reaction is carried out at a temperature within the range of from about 70° to about 90° C.

7. The method of claim 4, wherein the ratio of manganous ion to oxychloride ion in the liquid reaction mass is maintained from about 40 to about 50.

8. A method of preparing gamma phase manganese dioxide which comprises: reacting a liquid reaction mass of an alkaline hypochlorite solution selected from the group consisting of the hypochlorites of calcium, magnesium and strontium with an aqueous manganese salt solution at a temperature within the range of from about 10° C. to about 60° C. and at a pH of from about 1 to about 3.5, while maintaining a ratio of manganous ion to oxychloride ion in the liquid reaction mass of at least about 2, said manganese salt so-reacted having an anion which does not form insoluble by-products with said hypochlorite, thereby forming solid gamma phase manganese dioxide precipitate; and separating said precipitate from said reaction mass.

9. A method of preparing gamma phase manganese dioxide which comprises: reacting a liquid reaction mass of an alkaline calcium hypochlorite solution with an aqueous solution of a manganese salt selected from the group consisting of manganese chloride and manganese nitrate at a temperature within the range of from about 10° C. to about 60° C. and at a pH of from about 1 to about 3.5, while maintaining a ratio of manganous ion to oxychloride ion in the liquid reaction mass of at least about 2, thereby forming solid gamma phase manganese dioxide precipitate; and separating said precipitate from said reaction mass.

10. The method of claim 9, wherein the calcium hypochlorite solution has a pH of about 12.

11. The method of claim 9, wherein the reaction is carried out at a temperature within the range of from about 25° C. to about 50° C.

12. The method of claim 9, wherein the ratio of manganous ion to oxychloride ion in the reaction mass is maintained from about 40 to about 50.

13. A method of preparing epsilon phase manganese dioxide which comprises: reacting a liquid reaction mass of an alkaline hypochlorite solution selected from the group consisting of the hypochlorites of calcium, magnesium and strontium with an aqueous manganese salt solution at a temperature within the range of from about 10° C. to about 60° C. and at a pH of from about 1 to about 3.5, while maintaining a ratio of manganous ion to oxychloride ion in the liquid reaction mass below about 2, the manganese salt so-reacted having an anion which does not form insoluble by-products with said hypochlorite solution, thereby forming solid epsilon phase manganese dioxide precipitate; and separating said precipitate from said reaction mass.

14. A method of preparing epsilon phase manganese dioxide which comprises: reacting a liquid reaction mass of an alkaline calcium hypochlorite solution with an aqueous solution of a manganese salt selected from the group consisting of manganese chloride and manganese nitrite, at a temperature within the range of from about 10° C. to about 60° C. and at a pH of from about 1 to about 3.5, while maintaining a ratio of manganese ion to oxychloride ion in the liquid reaction mass below about 2, thereby forming solid epsilon phase manganese dioxide precipitate; and separating said precipitate from said reaction mass.

15. The method of claim 14, wherein the calcium hypochlorite solution has a pH of about 12.

16. The method of claim 14, wherein the reaction is carried out at a temperature within the range of from about 25° C. to about 50° C.

17. The method of claim 14, wherein the ratio of manganous ion to oxychloride ion in the reaction mass is maintained from about 0.1 to about 0.01.

References Cited

UNITED STATES PATENTS

| | | | |
|---|---|---|---|
| 1,269,914 | 6/1918 | Ellis et al. | 23—145 |
| 1,269,915 | 6/1918 | Ellis et al. | 23—145 |
| 2,757,071 | 7/1956 | Welsh et al. | 23—145 |
| 2,885,262 | 5/1959 | Fleischer et al. | 23—145 |

FOREIGN PATENTS 1,306,706  9/1962  France.

OSCAR R. VERTIZ, *Primary Examiner.*

HOKE S. MILLER, *Assistant Examiner.*